(12) United States Patent
Stein

(10) Patent No.: US 7,113,867 B1
(45) Date of Patent: Sep. 26, 2006

(54) SYSTEM AND METHOD FOR DETECTING OBSTACLES TO VEHICLE MOTION AND DETERMINING TIME TO CONTACT THEREWITH USING SEQUENCES OF IMAGES

(75) Inventor: Gideon P. Stein, Jerusalem (IL)

(73) Assignee: Mobileye Technologies Limited, Nicosia (CY)

( * ) Notice: Subject to any disclaimer, the term of this patent is extended or adjusted under 35 U.S.C. 154(b) by 0 days.

(21) Appl. No.: 09/723,755

(22) Filed: Nov. 26, 2000

(51) Int. Cl.
*G06F 17/10* (2006.01)

(52) U.S. Cl. .................................... 701/301

(58) Field of Classification Search .......... 701/36, 701/45, 300–302, 28, 117; 340/435–437, 340/901, 903, 905, 937, 933; 382/104, 106, 382/107; 342/454–455
See application file for complete search history.

(56) References Cited

U.S. PATENT DOCUMENTS

| | | | |
|---|---|---|---|
| 5,515,448 A | 5/1996 | Nishitani | ............ 382/106 |
| 5,521,633 A | 5/1996 | Nakajima et al. | |
| 5,529,138 A | 6/1996 | Shaw et al. | |
| 5,559,695 A * | 9/1996 | Daily | ............ 701/1 |
| 5,642,093 A | 6/1997 | Kinoshita et al. | ............ 340/439 |
| 5,646,612 A | 7/1997 | Byon | |
| 5,809,161 A | 9/1998 | Auty et al. | |
| 5,850,254 A | 12/1998 | Takano et al. | ............ 348/148 |
| 5,913,375 A | 6/1999 | Nishikawa | |
| 5,987,152 A | 11/1999 | Weisser | |
| 6,246,961 B1 | 6/2001 | Ishikawa Naote et al. | |
| 2004/0022416 A1 | 2/2004 | Lemelson et al. | |

FOREIGN PATENT DOCUMENTS

| | | |
|---|---|---|
| JP | 06107096 | 4/1994 |
| JP | 20010347699 | 2/2001 |

* cited by examiner

*Primary Examiner*—Thu V. Nguyen
(74) *Attorney, Agent, or Firm*—Fenster & Company

(57) ABSTRACT

A time-to-contact estimate determination system is disclosed for generating an estimate as to the time-to-contact of a vehicle moving along a roadway with an obstacle. The time-to-contact estimate determination system comprises an image receiver and a processor. The image receiver is configured to receive image information relating to a series of at least two images recorded as the vehicle moves along a roadway. The processor is configured to process the image information received by the image receiver to generate a time-to-contact estimate of the vehicle with the obstacle.

7 Claims, 4 Drawing Sheets

SYSTEM AND METHOD FOR DETECTING OBSTACLES TO VEHICLE MOTION AND DETERMINING TIME TO CONTACT THEREWITH USING SEQUENCES OF IMAGES

INCORPORATION BY REFERENCE

U.S. patent application Ser. No. 09/723,754, filed on Nov. 26, 2000, now U.S. Pat. No. 6,704,621 in the names of Gideon P. Stein et al., and entitled "System and Method for Estimating Ego-Motion of a Moving Vehicle Using Successive Images Recorded Along the Vehicles Path of Motion" (hereinafter referred to as "the Stein patent application"), assigned to the assignee of the present application, incorporated herein by reference.

FIELD OF THE INVENTION

The invention relates generally to the field of systems and methods for estimating time-to-contact between a moving vehicle and an obstacle and more specifically to systems and methods that estimate time-to-contact using successively-recorded images recorded along the vehicle's path of motion.

BACKGROUND OF THE INVENTION

Accurate estimation of the time-to-contact between a vehicle and obstacles is an important component in autonomous driving and computer vision-based driving assistance. Using computer vision techniques to provide assistance while driving, instead of mechanical sensors, allows for the use of the information that is recorded for use in estimating vehicle movement to also be used in estimating ego-motion identifying lanes and the like, without the need for calibration between sensors as would be necessary with mechanical sensors. This can reduce the cost of the arrangements provided to provide time-to-contact estimates and maintenance that may be required therefor.

SUMMARY OF THE INVENTION

The invention provides a new and improved system and method that estimates time-to-contact of a vehicle with an obstacle using successively-recorded images recorded along the vehicle's path of motion.

In brief summary, the inventio provides a time-to-contact estimate determination system for generating an estimate as to the time-to-contact of a vehicle moving along a roadway with an obstacle. The time-to-contact estimate determination system comprises an image receiver and a processor. The image receiver is configured to receive image information relating to a series of at least two images recorded as the vehicle moves along a roadway. The processor is configured to process the image information received by the image receiver to generate a time-to-contact estimate of the vehicle with the obstacle.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
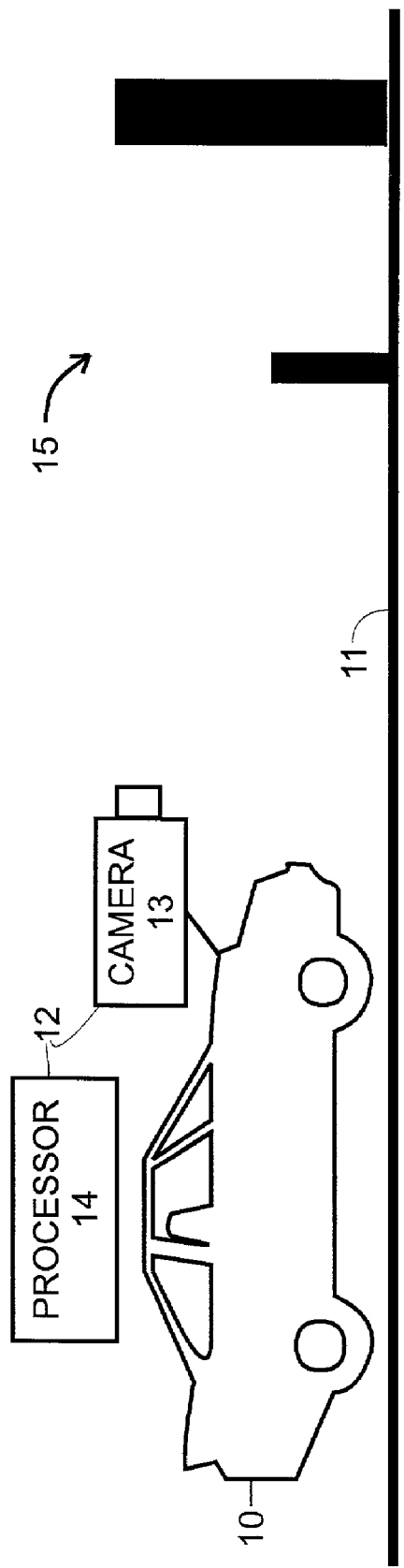
FIG. 1 schematically depicts a vehicle moving on a roadway and including a time-to-contact estimation system constructed in accordance with the invention.

FIG. 1 schematically depicts a vehicle 10 moving on a roadway 11 and including a time-to-contact estimation system 12 constructed in accordance with the invention. The vehicle 10 may be any kind of vehicle 10 that may move on the roadway 11, including, but not limited to automobiles, trucks, buses and the like. The time-to-contact estimation system 12 includes a camera 13 and a processor 14. The camera 13 is mounted on the vehicle 10 and is preferably pointed in a forward direction, that is, in the direction in which the vehicle would normally move, to record successive images as the vehicle moves over the roadway. Preferably as the camera 13 records each image, it will provide the image to the processor 14. The processor 14, in turn, will process information that it obtains from the successive images, possibly along with other information, such as information from the vehicle's speedometer (not separately shown) to estimate a time-to-contact value corresponding to the estimated time-to-contact, if any, of the vehicle 10 with one or more obstacles, generally identified by reference numeral 15. The processor 14 may also be mounted in or on the vehicle 11 and may form part thereof. The time-to-contact estimates generated by the processor 14 may be used for a number of things, including, but not limited to autonomous driving by the vehicle, providing assistance in collision avoidance, and the like. Operations performed by the processor 14 in estimating time-to-contact will be described in connection with the flow chart depicted in FIG. 3.

Before proceeding further, it would be helpful to provide some background for the operations performed by the collision detection and time-to-contact estimation processor 14 depicted in FIG. 1 in detecting possible obstacles to motion of the vehicle 10 and the time period to contact between the vehicle 10 and the respective obstacles, if any. Generally, the operations performed by the processor 14 can be divided into two phases, namely, an obstacle detection phase and a time to contact estimation phase. It will be appreciated that these phases may overlap in connection with various ones of the obstacles, with the processor 14 engaging in the obstacle detection phase to attempt to detect new obstacles while it is engaging in the time to contact estimation phase to determine time-to-contact with previously-detected obstacles.

During the obstacle detection phase, two general operations are performed. Initially, using a roadway deletion operator, as between successive images $\Psi$, $\Psi'$, . . . , the portions of the images that comprise projections of the roadway are identified. The portions of the images that are identified as comprising projections of the roadway will be ignored. Using an obstacle detection operator, portions of the images other than those that comprise projections of the roadway are analyzed to identify obstacles. After the obstacles are identified, during the time to contact estimation phase, a time-to-contact estimate is generated for the identified obstacles. The time-to-contact estimate indicates whether the vehicle 10 and obstacle are moving closer together, farther apart, or maintaining a constant separation. In particular, if the time-to-contact estimate for a particular obstacle is positive, the vehicle 10 and the obstacle are moving closer together, if the estimate is infinite, the separation is constant, and if the estimate is negative, the vehicle 10 and the obstacle are moving farther apart.

It will be appreciated that the time-to-contact estimate generated for a particular pair of images $\Psi$ and $\Psi'$ will provide an estimate as to the time-to-contact at the time that the later image $\Psi'$ was recorded. However, the time-to-contact estimate generated as described herein does not take into account other information that may be useful in determining the likelihood of whether the vehicle 10 will contact the obstacle if their relative motion remains constant. For example, ego-motion information (which may be provided as generated, for example, using a methodology described in the Stein patent application) and information as to the shape of the roadway and expected path of the vehicle may be useful in determining whether the vehicle will likely contact the obstacle. If, for example, the obstacle is in the same lane as the vehicle 10, and if the time-to-contact estimate is positive, indicating that the separation of the vehicle 10 and obstacle is decreasing, it may be determined that the vehicle 10 will likely contact the obstacle if the vehicle's motion is not changed. In addition, using the same information, strategies may be developed for avoiding contact, such as changing speed changing lanes or other strategies as will be apparent to those skilled in the art.

As noted above, during the obstacle detection phase, a road detection operator and an obstacle detection operator are used to facilitate identification of obstacles. Although the obstacle detection operator alone could be used in identification of obstacles, since the roadway is not an obstacle, and since typically the projection of the roadway typically comprises relatively large portions of the respective images $\Psi$ and $\Psi'$, those portions can be ignored in applying the obstacle detection operator. The roadway detection operator initially tessellates, into corresponding regions "R," the image $\Psi$ and an image $\hat{\Psi}$, where image $\hat{\Psi}$ is the warp of image $\Psi'$ toward image $\Psi$ using the estimated motion of the vehicle between the time at which image $\Psi$ was recorded to the time at which image $\Psi'$ is recorded, and generates values "Q" as follows:

$$Q = \sum_{x,y \in R} (\hat{\Psi}' - \Psi)^2. \tag{1}$$

The estimated motion that is used to generate the warped image $\hat{\Psi}$ comprises the translation and rotation of the vehicle 10 as between the point in time at which image $\Psi$ was recorded and the point in time at which image $\Psi'$ was recorded, and may be an initial guess based on, for example, the vehicle's speed as provided by a speedometer, or the estimated motion as generated as described in the Stein patent application. It will be appreciated that the warped image $\hat{\Psi}$ generally reflects an estimate of what the image would have been at the time that the image $\Psi$ was recorded. This holds for regions that are projections of the roadway, but not necessarily for other regions, and particular will not hold for regions that have a vertical extent, which will be the case for obstacles. Accordingly, regions in images $\Psi$ and $\hat{\Psi}'$ for which the value "Q" is below a selected threshold will be deemed to be regions that are projections of the roadway, and other regions will be deemed not to be regions that are projections of the roadway. Similarly, regions in image $\Psi'$ which were warped to regions in image $\hat{\Psi}$ that are deemed to be regions that are projections of the roadway, are also deemed regions that are projections of the roadway, and other regions in image $\Psi'$ are deemed not to be projections of the roadway.

After the roadway detection operator has been used to identify regions in images $\Psi$ and $\Psi'$ that are not projections of the roadway, those regions are processed using the obstacle detection operator to detect obstacles in those regions. Generally, it will be appreciated that, unlike the roadway or elements, artifacts such as roadway markings, shadows cast on the roadway surface, and the like, all of which have only a horizontal extent, obstacles have a vertical extent as well as a horizontal extent. Accordingly, as between two successive images $\Psi$ and $\Psi'$, artifacts such as markings on the roadway surface, shadows cast on the roadway surface, and the like, will exhibit expansion along the images' horizontal axes and little or no expansion along the vertical axes. On the other hand, obstacles, which have vertical extent, will exhibit more uniform expansion along the images' vertical axes as well as along the horizontal axes.

With this observation, in the obstacle detection phase, the images are processed using two filters are used, namely, a roadway filter and an obstacle filter. The roadway filter filters out portions the roadway and associated artifacts on the images $\Psi$ and $\Psi'$, and leaves the obstacles. The affine motion of a patch as between image $\Psi$ and image $\Psi'$ that is a projection of an obstacle exhibits a generally uniform scaling as around a "focus of expansion" ("FOE") for the obstacle. That is, if the FOE of an obstacle is at point $p_{FOE}(x_0,y_0)$ in the image $\Psi$, the motion vector $(u,v)$ of a projection of a point $P(X,Y,Z)$ on the obstacle, which projects onto point $p(x,y)$ in the image $\Psi$, will have components $$u = s(x - x_0) \tag{2}$$

$$v = s(y - y_0) \tag{3}$$

where "s" is a constant that reflects the uniform scaling. The components of the motion vector indicate the horizontal and vertical motion of a projection of a point $P(X,Y,Z)$ in three dimensional space as between the projection $p(x,y)$ in image $\Psi$ and the projection $p'(x',y')$ in image $\Psi'$. If the coordinates of the FOE are not known, the motion vector will still reflect a uniform scaling, and will also reflect a translation $$u = sx + x_f \tag{4}$$

$$v = sy + y_f \tag{5}$$

where $x_f = -sx_0$ and $y_f = -sy_0$. It will be appreciated that, in equations (4) and (5), the "sx" and "sy" terms reflect the uniform scaling, and the $x_f$ and $y_f$ terms reflect the translation. Since, for the motion vector, the components $u = x'-x$ and $v = y'-y$, where "x" and "y" are the coordinates of the projection of a point in three-dimensional space in image $\Psi$ and "x'" and "y'" are the coordinates of the projection of the same point in three-dimensional space in image $\Psi'$, and so $$\begin{pmatrix} x' \\ y' \end{pmatrix} = \begin{bmatrix} (s+1) & 0 \\ 0 & (s+1) \end{bmatrix} \begin{pmatrix} x \\ y \end{pmatrix} + \begin{pmatrix} -sx_0 \\ -y_0 \end{pmatrix}. \quad (6)$$

Substituting equation (6) into the constant-brightness criterion $$uI_x + vI_y + I_t = 0 \quad (7),$$

yields $$(sx + x_f)I_x + (sy + y_f)I_y = -I_t \quad (8),$$

which can be written $$\begin{pmatrix} I_x \\ I_y \\ xI_x + yI_y \end{pmatrix}^T \begin{pmatrix} x_f \\ y_f \\ s \end{pmatrix} = -I_t, \quad (9)$$

where the superscript "T" represents the transpose operation. Regions of images $\Psi$, $\Psi'$ for which equation (9) hold represent obstacles.

If one or more obstacles is detected during the obstacle detection phase, the processor 14 can generate an estimate of the time-to-contact, if any, of the vehicle 10 with the obstacle. Although the time-to-contact will reflect the distance between the vehicle and the obstacle, it will be appreciated that in many circumstances the time-to-contact is a more useful metric. The distance of the obstacle to the image plane of the camera 13, which, in turn, reflects the distance of the obstacle to the vehicle 10, at the point in time T−ΔT at which image $\Psi$ was recorded is Z+ΔZ, and the distance at the point in time T at which image $\Psi'$ was recorded is Z. (It should be noted that the values of both "ΔT" and "ΔZ" are positive). If there is no change in relative motion between the vehicle 10 and the obstacle, the distance Z to the obstacle will be closed in a time period T, that is, the time-to-contact is T.

The processor 10 estimates the time-to-contact T in relation to the ratio of the scaling of the obstacle as recorded in the images $\Psi$ and $\Psi'$, if any, and specifically in relation to the scaling of the vertical dimension. The vertical dimension of the obstacle in image $\Psi$ is $$y_2 = \frac{fY}{Z + \Delta Z} \quad (10)$$

where "Y" refers to the height of the obstacle in three-dimensional space and "f" is the focal length of the camera 13. Similarly, the vertical dimension of the obstacle in image $\Psi'$ is $$y_1 = \frac{fY}{Z}, \quad (11)$$

since the height "Y" of the obstacle in three-dimensional space does not change as between the times at which the images $\Psi$ and $\Psi'$ are recorded. The scaling factor, or ratio, of the vertical dimensions "S" in the images is $$S = \frac{y_1}{y_2} = \frac{Z + \Delta Z}{Z} = 1 + \frac{\Delta Z}{Z}. \quad (12)$$

In addition, assuming that there is no change in motion as between the vehicle 10 and the obstacle, the relative speed $$\frac{\Delta Z}{\Delta T}$$

between the vehicle 10 and the obstacle during the time period between the points in time at which the images $\Psi$ and $\Psi'$ were recorded, will be the same as the relative speed $$\frac{Z}{T}$$

during the time period between the point in time at which the image $\Psi'$ was recorded and the point in time at which the vehicle 10 would contact the obstacle. That is $$\frac{\Delta Z}{\Delta T} = \frac{Z}{T}. \quad (13)$$

Rearranging equation 13, $$\frac{T}{\Delta T} = \frac{Z}{\Delta Z}. \quad (14)$$

Combining equation (14) and equation (12), $$S = 1 + \frac{\Delta Z}{Z} = 1 + \frac{\Delta T}{T}. \quad (15)$$

Rearranging equation (15) to solve for T, the time-to-contact, $$T = \frac{1}{S-1} \Delta T. \quad (16)$$

It will be appreciated that, if the value of ΔZ is positive and non-zero, from equation 12, the value of S will be greater than one, in which case the value of the factor $$\frac{1}{S-1}$$

in equation (16) will be greater than zero. In that case, the time-to-collision T will be positive. It will be appreciated that this can occur if the distance separating the vehicle 10 and the obstacle is decreasing. On the other hand, if the value of the ratio S is equal to one, which can occur if the vertical dimension of the obstacle in the image $\Psi$ is the same as the vertical dimension in the image $\Psi'$, the value of the factor $$\frac{1}{S-1}$$

in equation (16) is infinite, in which case the time-to-contact T will also be infinite. It will be appreciated that, when that occurs, if the vehicle 10 is moving, the obstacle will also be moving, and it will be moving at the same speed as the vehicle 10, and in that case, the separation between the vehicle 10 and the obstacle will be constant. Finally, if the value of the ratio S is less than one, which can occur if the vertical dimension of the obstacle in the image $\Psi$ is the greater than the vertical dimension in the image $\Psi'$, the value of the factor $$\frac{1}{S-1}$$

in equation (16) is negative, in which case the time-to-contact T will also be negative. It will be appreciated that, when that occurs, the obstacle will also be moving, and it will be moving at the a speed that is greater than, and in a direction away from, the vehicle 10. It will be appreciated that, using equation (16), the processor 14 can estimate the time-to-contact using only information from the images $\Psi$ and $\Psi'$ and the time period $\Delta T$, without needing any information as to the actual distance between the vehicle 10 and the obstacle.

Figure 2B:
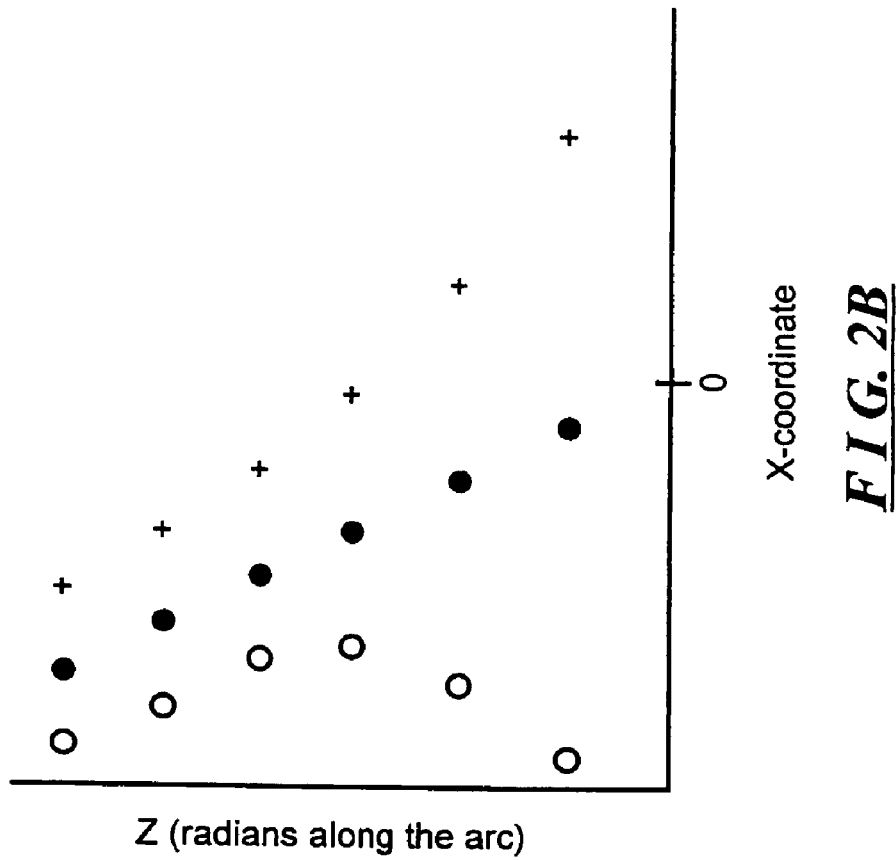
FIGS. 2A and 2B are useful in understanding the apparent horizontal motion of an obstacle in a series of images as a function of horizontal position of the obstacle relative to the vehicle, which is useful in estimating the likelihood of the vehicle contacting the obstacle.
Figure 2A:
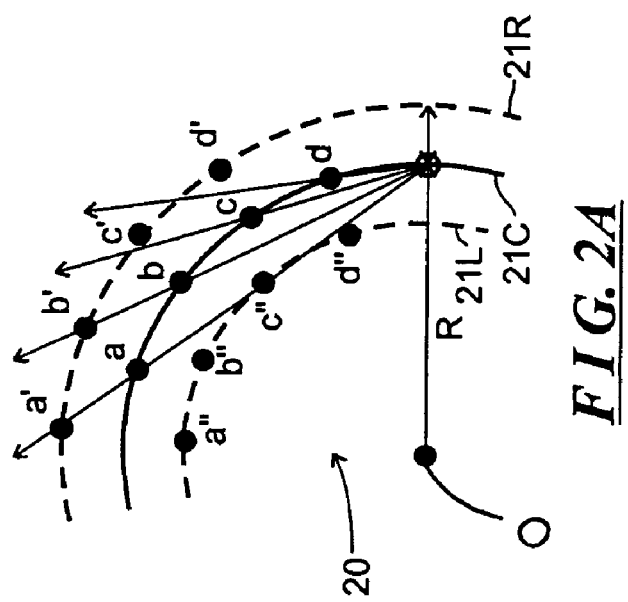

As noted above, the time-to-contact value generated as described above actually reflects the rate at which the separation between the vehicle 10 and the obstacle is decreasing at the point in time that the image $\Psi'$ is recorded. Depending on the particular positions and velocities (which reflect direction as well as speed) of the vehicle 10 and the obstacle at any point in time, as well as the sizes, and primarily the horizontal dimensions, of the vehicle 10 and the obstacle, the vehicle and obstacle may or may not actually come into contact. This will be described in connection with FIGS. 2A and 2B. With reference to FIG. 2A, that FIG. schematically depicts a portion of a curved roadway 20 with three lanes, including a center lane represented by line 21C, a lane to the left of the center lane represented by line 21L and a lane to the right of the center lane represented by line 21R. The center of curvature of the roadway is at O. The vehicle 10 is traveling in the center lane 21C, and obstacles, which comprise other vehicles, are traveling in all three lanes. To simplify the explanation, the coordinate system will be deemed to be moving with the vehicle 10. It will also be assumed that a series of images are recorded, including a first image $\Psi$ when the obstacles are at locations a, a', a'', a second image $\Psi''$ when the obstacles are at locations b, b', b'', a third image $\Psi'''$ when the obstacles are at locations c, c', c''', a fourth image $\Psi''''$ when the obstacles are at locations d, d', d''', and so forth. In this example, the separations between vehicle 10 and all three obstacles are decreasing. Graphs of the separations and the horizontal coordinates of the respective obstacles in the series of images (it will be appreciated that the vertical coordinates of the respective obstacles in the images will not change) are depicted in FIG. 2B, with the separation with the obstacle in lane 21C being represented by solid circles, the separation with the obstacle in lane 21L being represented by hollow circles, and the separation with the obstacle in lane 21R being represented by crosses ("+"). In FIG. 2B, the vehicle 10 will be considered to be located at the origin, that is, where the "x-coordinate" is zero and the Z-coordinate is zero, although it will be appreciated that, because the vehicle 10 will have a non-zero horizontal dimension, the portion of the horizontal dimension of the width subtended by the vehicle extends to the left and right of the origin by an amount associated with the width of the vehicle. As shown in FIG. 2B, all three obstacles will initially approach the vehicle 10, but at some point the separations between vehicle 10 and the obstacles in the left and right lanes 21R and 21L will again increase. However, the separation between obstacle in the same lane 21C as that of the vehicle 10 will continue to decrease. If the time intervals between times at which the images are recorded are uniform the horizontal coordinate of the projection of the obstacle in lane 21C will uniformly approach zero. For obstacles in the other lanes 21L and 22R, the movement of the horizontal coordinate will not be uniform. Using the information as to the uniformity of the progression of the horizontal coordinates of the projection of the vehicles across the successive images, the likelihood as to whether the vehicle will contact an obstacle can be determined.

Figure 3:
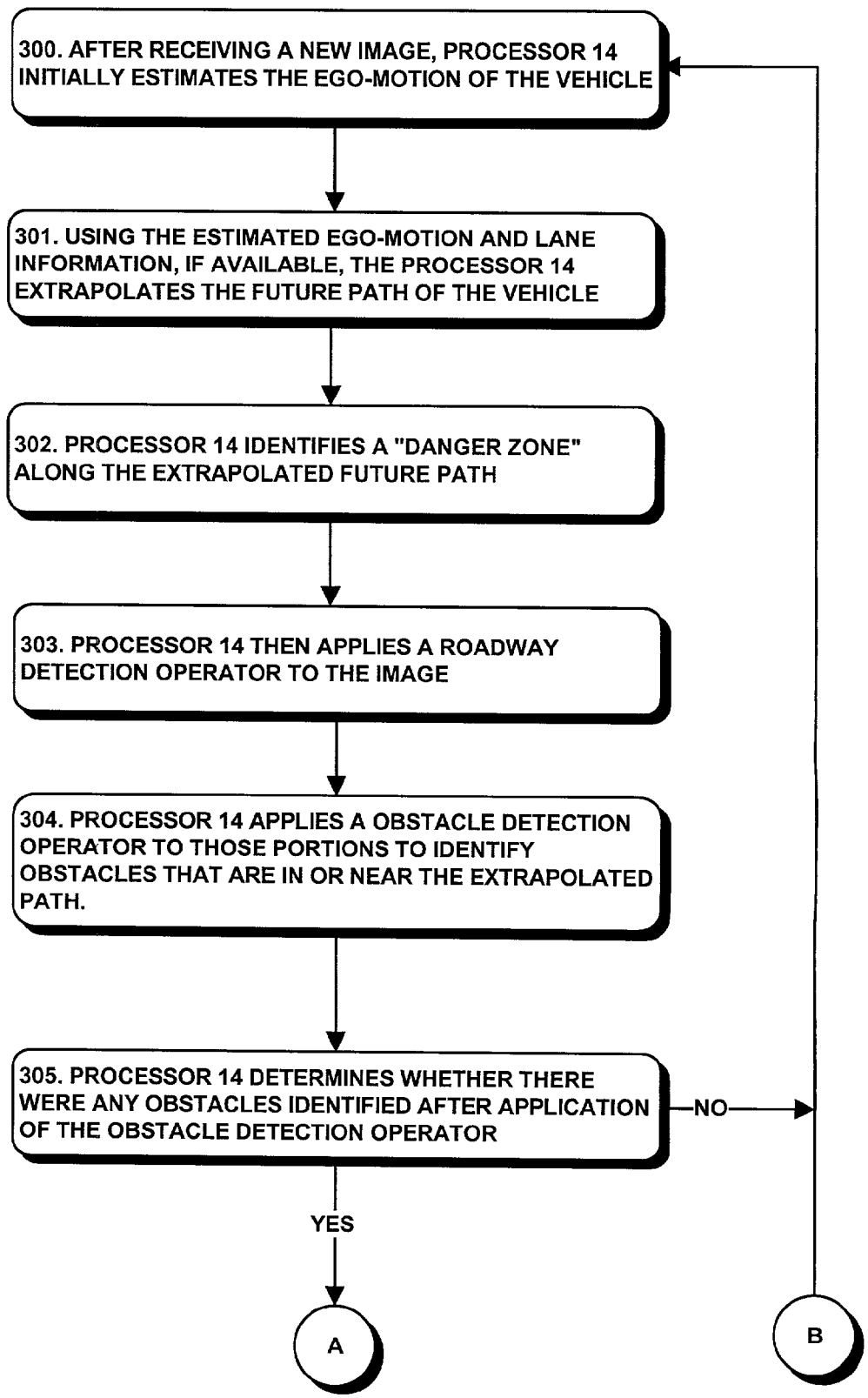
FIG. 3 and 3A is a flow chart depicting operations performed by the time-to-contact estimation system in estimating time-to-contact of the vehicle with an obstacle.
Figure 3A:
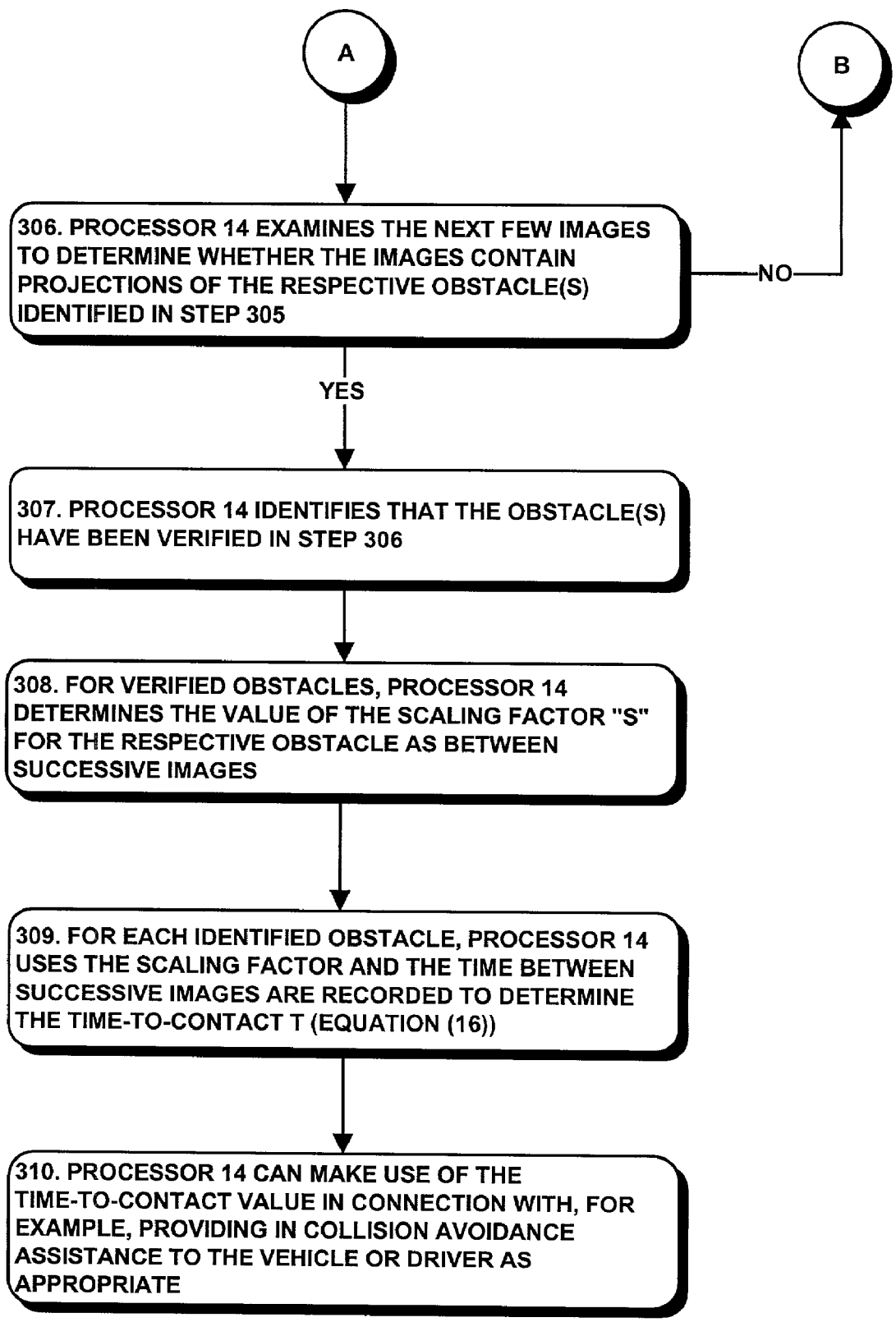

With this background, operations performed by the processor 14 in connection with determining the time-to-contact will be described in connection with the flow chart depicted in FIG. 3. With reference to FIG. 3, after receiving a new image $\Psi'$, the processor 14 initially estimates the ego-motion of the vehicle 10 (step 300) using, for example, a methodology described in connection with the Stein patent application. Using the estimated ego-motion and lane information, if available, the processor 14 extrapolates the future path of the vehicle (step 301) and identifies a "danger zone" along the extrapolated future path (step 302). In performing step 302, the processor 14 can make use of geometric assumptions that are based on the camera's calibration parameters, and the danger zone can, for example, comprise a trapezoidal region along the image of the roadway. The processor 14 then applies the roadway detection operator (step 303) and obstacle detection operator (step 304) to those portions to identify obstacles that are in or near the extrapolated path. Thereafter, if the processor 14 will determine whether there were any obstacles identified after application of the obstacle detection operator (step 305), and, if not return to step 300 to receive the next image.

On the other hand, if the processor 14 determines in step 305 that one or more obstacles have been identified in step 304, the processor 14 will examine the next few images $\Psi''$, $\Psi'''$, $\Psi''''$, . . . to determine whether the images contain projections of the respective obstacle(s) (step 306). Tracking obstacle(s) whose projections have been detected in one or two images through successive images provides verification that the obstacles in fact exist and are not artifacts in the respective images. For any obstacles whose projections are recorded in a predetermined number of subsequent images, the processor 14 will determine that the obstacle(s) have been verified (step 307), and, for any verified obstacles, the processor 14 will determine the value of the scaling factor "S" for the obstacle as between successive images (step 308). After determining the value of the scaling factor, the processor 14 uses that value and the value $\Delta T$ in equation (16) to determine the time-to-contact T (step 309). Thereafter, the processor can make use of the time-to-contact value in connection with, for example, providing in collision avoidance assistance to the vehicle or driver, if, for example, the time-to-contact value is positive. As noted above, if the time-to-contact value is not positive, there will be no contact between the vehicle 10 and the obstacle.

The invention provides a number of advantages. In particular, the invention provides an arrangement for estimating the time-to-contact of a vehicle 10 with an obstacle directly from successively-recorded images of the obstacle, without requiring other mechanical or electronic sensors, which can be expensive to install and maintain.

It will be appreciated that a number of changes and modifications may be made to the time-to-contact estimation system 12 described above. For example, instead of using the scaling of the vertical dimension of obstacles as between image $\Psi$ and $\Psi'$, the system 12 may use the scaling of the horizontal dimension, or both.

In addition, it will be appreciated that images $\Psi$ and $\Psi'$ are preferably rectified as, for example, described in the Stein patent application, so that their image planes are perpendicular to the roadway plane.

Furthermore, it will be appreciated that roadway detection filters and obstacle detection filters can be used other than or in addition to those described herein. For example, a filter such as one described in the aforementioned Stein patent application can be used to identify patches that contain projections of obstacles.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A time-to-contact estimate determination system for generating an estimate as to the time-to-contact of a vehicle moving along a roadway with an obstacle comprising:
   A. an image receiver configured to receive image information relating to a series of at least two images as the vehicle moves along a roadway; and characterized by
   B. a processor configured to determine a scaling factor that defines a ratio between a dimension length associated with two features of the obstacle in a first one of the at least two images and the same length between the same two features of the obstacle in a second one of the at least two images and uses the ratio to generate a time-to-contact estimate of the vehicle with the obstacle.

2. A system according to claim 1 wherein the scaling factor defines a ratio between vertical dimensions of the obstacle in the images and uses the ratio to estimate the time-to-contact.

3. A system according to claim 1 wherein the scaling factor defines a ratio between horizontal dimensions of the obstacle in the images and uses the ratio to estimate the time-to-contact.

4. A system according to claim 1 wherein the at least two images comprises more than two images.

5. A system according to claim 4 wherein the processor processes the image information to determine a lateral displacement of the object relative to a position of the vehicle.

6. A system according to claim 5 wherein the processor determines a likelihood of collision responsive to whether or not the lateral displacement substantially uniformly approaches zero.

7. A system according to claim 1 wherein the processor generates a time-to-contact T in accordance with the expression $T=[1/(S-1)]\Delta T$ where S is the sealing factor and $\Delta T$ is a time lapse between two images of the at least two images.

* * * * *